United States Patent Office 3,536,635
Patented Oct. 27, 1970

3,536,635
BASIC NITROGEN POLYCONDENSATES OF DISECONDARY DIAMINES OR p-MENTHANEDIAMINE
Giuseppe Cantatore, Terni, Italy, assignor to Montecatini Edison S.p.A., Milan, Italy, a corporation of Italy
No Drawing. Application Mar. 31, 1967, Ser. No. 637,861, which is a continuation-in-part of application Ser. No. 212,119, July 24, 1962. Divided and this application June 16, 1969, Ser. No. 833,708
Claims priority, application Italy, July 27, 1961, 13,894/61
Int. Cl. C08f 29/12; C08g 23/06
U.S. Cl. 260—2          2 Claims

ABSTRACT OF THE DISCLOSURE

Basic nitrogen polycondensates for improving the dye-receptivity of polyolefins are obtained by reaction (a) a member selected from the group consisting of disecondary diamines and polyamines containing at least two primary amino groups bound to tertiary carbon atoms and which behave as disecondary diamines due to steric hindrance, (b) epichlorohydrin and (c) a dihalide selected from the group consisting of dihalo aliphatics containing from about 8 to 20 carbon atoms, dihalo cycloaliphatics containing from about 8 to 20 carbon atoms, and dihalo aromatics, in a molar ratio of 1 mol of the disecondary diamine or polyamine with from about 0.1 to 0.9 mol of epichlorohydrin and from about 0.9 to 0.1 mol of dihalide, the total of epichlorohydrin and dihalide being from about 0.85 to 1 mol per mol of the amine.

CROSS-REFERENCES TO RELATED APPLICATIONS

This application is a division of copending application Ser. No. 637,861 filed Mar. 31, 1967, which is in turn a continuation-in-part of application Ser. No. 212,119, filed July 24. 1962, and now abandoned.

BACKGROUND OF THE INVENTION

Field of the invention

This invention relates to new basic nitrogen polycondensate additives for improving the dye-receptivity of polyolefins. More particularly, the new polycondensates of the present invention are particularly useful in preparing blends with polyolefins, which blends are used in the production of textile fibers, and render the fibers more receptive to dyes than previously known polyolefin based fibers.

Description of the prior art

Previously, methods for preparing textile fibers having a considerable receptivity to dyes have been proposed. These methods comprise extruding mixes containing polyolefins and basic nitrogen compounds, which compounds are obtained by the condensation of epichlorohydrin with aliphatic amines or diamines or by the condensation of epichlorohydrin with a diamine, followed by alkylation with alkyl halides.

SUMMARY OF THE INVENTION

It has now surprisingly been found that dye-receptive compositions, preferably in the form of textile fibers, having a particular affinity for dyes are obtained by extruding mixes containing at least one polyolefin with 1 to 25% by weight, based on the weight of the mix, of nitrogen polycondensates possessing a basic character prepared by reacting one or more disecondary amines with epichlorohydrin and certain halogen derivatives.

Accordingly, the present invention provides additives for improving the dye-receptivity of polyolefins which comprise basic nitrogen polycondensates obtained by reacting (a) a member selected from the group consisting of disecondary diamines and polyamines containing at least two primary amino groups bound to tertiary carbon atoms and which behave as disecondary diamines due to steric hindrance, (b) epichlorohydrin and (c) a dihalide selected from the group consisting of dihalo aliphatics containing from about 8 to 20 carbon atoms, dihalo cycloaliphatics containing from about 8 to 20 carbon atoms, and dihalo aromatics, in a molar ratio of 1 mol of the disecondary diamine or the polyamine with from about 0.1 to 0.9 mol of epichlorohydrin and from about 0.9 to 0.1 mol of dihalide, the total of epichlorohydrin and dihalide being from about 0.85 to 1 mol per mol of the amine.

DESCRIPTION OF THE PREFERRED EMBODIMENTS

According to a particular feature of the present invention, the preparation of the nitrogen polycondensate of the invention is carried out by reacting 1 mol of the disecondary diamine or the polyamine either with from about 0.1 to 0.9 mol of epichlorohydrin and from about 0.9 to 0.1 mol of dihalide, the total of epichlorohydrin and dihalide being from about 0.85 to 1 mol per mol of the amine.

The preparation of the nitrogen polycondensate compound of the present invention can be carried out, if desired, in the presence of suitable solvents such as methanol, ethanol, isopropanol, butyl alcohols, heptane and the like, and of condensing agents such as NaOH, KOH, sodium acetate and the like. The reaction is carried out at a temperature between room temperature and the reflux temperature, i.e., the boiling temperature of the solvent.

Disecondary amines such as aliphatic, aromatic, cycloaliphatic or heterocyclic disecondary amines containing 4 to 20 carbon atoms, such as piperazine, 2-methylpiperazine, 2,5-dimethylpiperazine, N,N'-dimethylhexamethylenediamine, N,N'-diisopropylhexamethylenediamine, N,N'-dimethylethylenediamine and N,N'-diisopropylethylenediamine, can be employed. In lieu of these disecondary diamines, polyamines containing two primary amino groups bound to tertiary carbon atoms (e.g., 1,8-paramenthanediamine), which behave as disecondary amines due to steric hindrance, can also be employed in the present invention.

As the halogen-containing compounds, dihalides of aliphatic or cycloaliphatic compounds containing 8 to 20 carbon atoms or dihalides of aromatic compounds can be used, such as dichloromethyl-m-xylene, p-xylylene dichloride and 1,10-dichlorodecane.

The mix containing the nitrogen polycondensate and the polyolefin or polyolefins may be obtained by agitating these products at room temperature in Henschel or Werner-type mixers or in ball mills or similar apparatus.

To obtain dye-receptive fibers, the mix is then granulated by melting in a screw device and is extruded in a melt-spinning device, preferably in absence of air and in the presence of an inert gas, at a temperature between about 180° C. and 320° C.

The spinning of the mixes can be carried out in the presence of a small amount of a solid dispersing agent which facilitates the homogeneous dispersion of the nitrogen product in the polymer mass and is preferably a compound such as cetyl and stearyl alcohol, stearic and terephthalic acid, benzoin, furoin, vinyl stearate, mono-, di- and tri-stearic esters of glycerol, monoethanolamine stearate, stearic amide, -diethanollauryl amide, $C_6$–$C_{30}$ aliphatic amines, condensation products of ethylene oxide with alcohols, amines and phenols, polystearamide, polyacrylic acid, polystyrene and styrene copolymers, terpene polymers, etc.

The filaments obtained by extrusion of the mixes may be mono- or pluro-filaments and are used for preparing continuous fibers, staple fibers, bulk fibers or bulk staple fibers.

These mono- or pluro-filaments may be subjected to treatments for rendering the basic nitrogen polycondensates water-insoluble. Particularly suitable for this purpose are treatments with formaldehyde, diisocyanates, monomers which are capable of giving tridimensional structures such as divinylbenzene, vinylacetylene and the like, or with diepoxy compounds. These treatments may be carried out before or after stretching.

The stretching is effected using ratios between 1:2 and 1:10, at temperatures between 80° and 150° C., with suitable stretching devices heated with hot air, steam or a similar fluid or on a heated plate.

The spinning is preferably carried out by extrusion through spinnerets having holes with a length/diameter ratio higher than 1.

The fibers thus obtained exhibit a remarkable receptivity to dyes such as acid dyes, metallized dyes and dispersed dyes. They have a good affinity also for the basic and vat dyes. Additionally, they show increased stability, particularly with respect to light.

The following examples are presented to illustrate the invention without limiting its scope.

In these examples, all parts and proportions are by weight unless otherwise indicated. In each case the intrinsic viscosity of the polypropylene was measured in tetrahydronapthalene at 135° C. The residue after heptane extraction indicates the content of isotactic macromolecules in the polymer.

Example 1

430 g. (5 mols) of anhydrous piperazine and 304.5 g. (1.5) mols of dichloromethyl-m-xylene [1,3-dimethyl-4,6-di(chloromethyl)benzene, $C_{10}H_{12}Cl_2$] suspended in 2,500 cc. of ethanol were introduced into a 6-liter 3-necked flask provided with a mercury-valve agitator, a thermometer and reflux condenser. The mixture was agitated at 20–30° C. for 2 hours and then refluxed for 4 hours. During the last 2 hours of heating, 120 g. of NaOH were added in small portions.

The reaction mixture was then cooled to 20° C. and 324 g. (3.5 mols) of epichlorohydrin were added. After standing at 30–50° C. for 1 hour, the mixture was heated to 80° C. and this temperature maintained for 10 hours. During the last 5 hours, 140 g. of NaOH were added in small portions. Sodium chloride was separated by warm filtration and the solvent removed by heating under vacuum.

A white resinous product, melting at 63–71° C. and possessing a nitrogen content of 16.72% was obtained.

A mix was prepared at room temperature in Henschel-type mixer, from 9.6 kg. of polypropylene and 0.400 kg. of this nitrogen condensate.

The polypropylene used had the following characteristics:

$[\eta] = 1.43$;
Ash content = 0.031%;
Residue after heptane extraction = 96.7%.

The mixture was granulated and extruded under the following conditions:

Screw temperature = 230° C.;
Spinning head temperature = 220° C.;
Spinneret temperature = 220° C.;
Spinneret type = 60/0.8 x 16 mm.;
Maximum pressure = 47 kg./cm.$^2$;
Winding speed = 250 m./minute.

The fiber was stretched in a steam-heated device at a temperature of 130° C., with a stretching ratio of 1:5.

It was then subjected to a dimensional stabilization treatment at 105° C. for 10 minutes under conditions of free shrinking.

The characteristics of the stretched and thermostabilized fiber were as follows:

Tenacity = 5.2 g./den;
Elongation = 25%.

The fiber was then crimped and cut into a staple with a length of 6 cm. Intense solid colors were obtained on this staple upon dyeing with the following dyes:

Alizarine Yellow 2G (C.I. Mordant Yellow 1) (Acid dye)
Wool Red B (C.I. Acid Red 115) (Acid dye)
Alizarine Red S (C.I. Mordant Red) (Acid dye)
Alizarine Blue SE (C.I. Acid Blue 43) (Acid dye)
Acid Black JVS (C.I. Acid Black 1) (Acid dye)
Lanasyn Yellow GLN (C.I. Acid Yellow 112) (Metallized dye)
Lanasyn Red 2GL (C.I. Acid Red 216) (Metallized dye)
Lanasyn Brown 3RL (C.I. Acid Brown 30) (Disperse dye)
Setacyl Yellow 3G (C.I. Disperse Yellow 20) Disperse dye)
Cibacet Scarlet BR (C.I. Disperse Red 18) (Disperse dye)
Setacyl Brillant Blue BG (C.I. Disperse Blue) (Metallized dye)

The dyeing was carried out at the boiling point of the baths for 1½ hours, in baths containing 2.5% of dye, calculated on the weight of the fiber, with a fiber/bath ratio of 1:40.

The dyeing with the acid and metallized dyes was carried out in the presence of 3% of ammonium acetate (by weight of the fiber) and 1% of a surface active agent consisting of the condensation product of ethylene oxide with octyl phenol.

30 minutes after boiling commenced, 2% (by weight of the fiber) of a 10% acid acetic solution was added in order to improve the rate of utilization of the baths.

The dyeing with disperse (plastosoluble) dyes was carried out in the presence of 2% of surface active agent (by weight of the fiber).

The fibers, after dyeing, were rinsed with running water. These fibers exhibited intense colors in all cases after the dyeings with acid, metallized and disperse dyes. The fastness of these colors to light, washing and rubbing was completely satisfactory.

A further improvement in the color fastness was obtained by subjecting the fibers, before dyeing, to a treatment with a 3% aqueous solution of ethylene glycol diglycidyl ether at 120° C. for 5 minutes.

Example 2

172 g. (2 mols) of anhydrous piperazine and 105 g. (0.6 mols) of p-xylylene dichloride (1,4-di(chloromethyl)benzene, $C_8H_8Cl_2$) suspended in 800 cc. of ethanol were introduced into a 2-liter 3-necked flask provided with a mercury-valve agitator, a thermometer and a reflux condenser. The mixture was agitated for 2 hours at 20–30° C. and then refluxed for 4 hours. During the last two hours of heating, 48 g. of NaOH were added in small portions.

The reaction mixture was then cooled to 20° C. and 129.6 g. (1.4 mols) of epichlorohydrin were added. After agitation at 30–40° C. for 1 hour, the mixture was refluxed for 10 hours. During the last 5 hours of heating, 56 g. of NaOH were added in small portions. The solution was filtered and the solvent removed by heating under vacuum.

A white resinous product having a melting point of 106–114° C. and a nitrogen content of 17.74% was obtained.

A mix was prepared at room temperature in a Henschel-type mixer, from 5.760 kg. of polypropylene and 0.240 kg. of the nitrogen condensate.

The polypropylene used had the following characteristics:

[η]=1.42;
Ash content=0.031%;
Residue after heptane extraction=96.7%.

The mix was granulated and then extruded under the following conditions:

Screw temperature =230° C.;
Spinning head temperature=220° C.;
Spinneret type=60/0.8 x 16 mm.;
Maximum pressure=41 kg./cm.²;
Winding speed=250 m./minute.

The fiber was stretched in a steam-heated device at a temperature of 130° C., with a stretching ratio of 1:5. It was then subjected to a dimensional stabilization treatment under conditions of free shrinking at 105° C. for 10 minutes.

The stretched and thermostabilized fiber had the following characteristics:

Tenacity=5.5 g./den;
Elongation=22%.

The fiber was then crimped and cut into staple with a length of 6 cm. This staple gave intense solid colors upon dyeing with the dyes used in Example 1.

Example 3

172 g. (2 mols) of anhydrous piperazine, 84.4 g. (0.4 mols) of 1,10-dichlorodecane and 400 cc. of isopropanol were introduced into a 2-liter 3-necked flask provided with a mercury-valve agitator, a thermometer and a reflux condenser. The mixture was refluxed for 24 hours. 32 g. of NaOH were added and, after 1 hour, 148 g. (1.6 mols) of epichlorohydrin and 400 cc. of isopropanol were added to 20° C. The mixture was kept at 30–45° C. for 1 hour and then refluxed for 10 hours, adding 64 g. of NaOH in small portions during the last 5 hours of heating.

Sodium chloride was separated by filtration and the solvent is removed by heating under vacuum.

A mix was prepared at room temperature in a Henschel-type mixer from 4.800 kg. of polypropylene and 0.200 kg. of this nitrogen condensate.

The polypropylene used had the following characteristics:

[η]=1.42;
Ash content=0.031%;
Residue after heptane extraction=96.7%.

The mix was granulated and then extruded under the following conditions:

Screw temperature =230° C.;
Spinning head temperature=220° C.;
Spinneret temperature=220° C.;
Spinneret type=60/0.8 x 16 mm.;
Maximum pressure=40 kg./cm.²;
Winding speed=250 m./minute.

The fiber was stretched in a steam-heated device at a temperature of 130° C., with a stretching ratio of 1:5. It was then subjected to a dimensional stabilization treatment under conditions of free shrinking at 105° C. for 10 minutes.

The stretched and thermostabilized fiber had the following characteristics:

Tenacity=5.1 g./den.;
Elongation=21%.

The fiber was then crimped and cut into a staple having a length of 6 cm. This staple exhibited intense solid colors upon dyeing with the dyes used in Example 1.

Variations and modifications can, of course, be made without departing from the spirit and scope of the present invention.

Having thus described the invention, what I desire to secure by Letters Patent and hereby claim is:

1. A basic nitrogen polycondensate prepared by reacting in the following molar ratios: (a) 1 mol of a member selected from the group consisting of disecondary diamines and p-menthanediamine, (b) from about 0.1 to 0.9 mol of epichlorohydrin and (c) from about 0.9 to 0.1 mol of a dihalide selected from the group consisting of dihalo aliphatics containing from about 8 to 20 carbon atoms, dihalo cycloaliphatics containing from about 8 to 20 carbon atoms, and dihalo aromatics, the total of epichlorohydrin and dihalide being from about 0.85 to 1 mol per mol of the amine.

2. The polycondensate of claim 1 wherein said dihalide is selected from the group consisting of dichloromethyl-m-xylene, p-xylylene dichloride and 1,10-dichlorodecane.

References Cited

Chemical Abstracts 59, 2983d (1962).
Chemical Abstracts 61, 769h (1964).
Chemical Abstracts 62, 5398c (1965).

WILLIAM H. SHORT, Primary Examiner

E. A. NIELSEN, Assistant Examiner

U.S. Cl. X.R.

8—162; 260—897